Jan. 23, 1945.  G. W. CARLSON  2,367,714
CONTROL VALVE FOR AUTOMATIC TYPEWRITERS
Filed Jan. 23, 1942  2 Sheets-Sheet 1

INVENTOR
George W. Carlson
by Christy, Parmelee, and Strickland
his attorneys

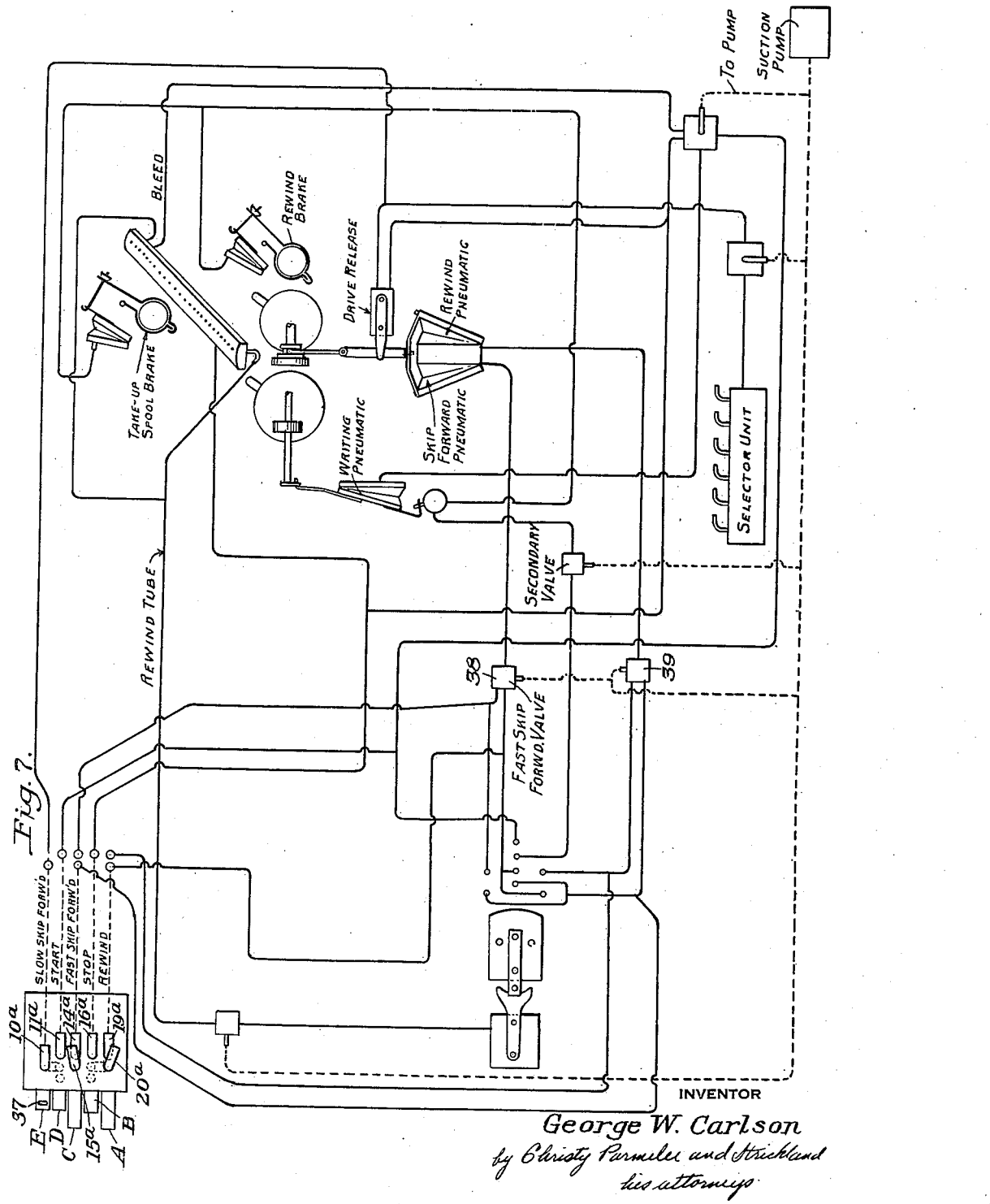

Patented Jan. 23, 1945

2,367,714

UNITED STATES PATENT OFFICE 2,367,714

CONTROL VALVE FOR AUTOMATIC TYPEWRITERS

George W. Carlson, Pittsburgh, Pa., assignor to Robert H. McClintic, Pittsburgh, Pa.

Application January 23, 1942, Serial No. 427,896

7 Claims. (Cl. 242—55)

This invention is for a control valve for use on pneumatically operated automatic typewriters and has for its purpose to provide a unitary control element whereby the various functions of the automatic mechanism may be more readily and easily controlled than with mechanisms heretofore provided for this purpose.

In my copending application Serial No. 331,564, filed April 25, 1940, for Letter selector for automatic typewriters there is disclosed a drive for the record roll of a pneumatic typewriter in which the record may be driven forwardly at slow speed to operate the typewriter. The record may also be driven forward at high speed without operating the typewriter where it is desired to skip from one part of the record to another. The record roll is also rewound at high speed. As disclosed in the said application provision is made for selecting the part of the record that is to be used and rewinding the part of the record that is to be used after each operation. In addition to the automatic selector to which the said application is directed there are also manual controls for accomplishing the same result. These manual controls as heretofore constructed involved the use of a number of separate push buttons. According to the present invention a single control element is provided to replace this series of push buttons. A single knob conveniently located on the machine is accessible to the operator and from this central knob all of the functions of the machine can be manually controlled. This simplifies the control, enables the travel of the record to be instantly stopped merely by pushing down on the knob, and renders the operation of the machine easier to learn and the valve is more convenient to use. The invention may be readily understood by reference to the accompanying drawings, in which Figure 1 is a top plan view of the control knob;

Figure 7 is a diagram of a pneumatic circuit in connection with which the valve is used.

Figure 1:
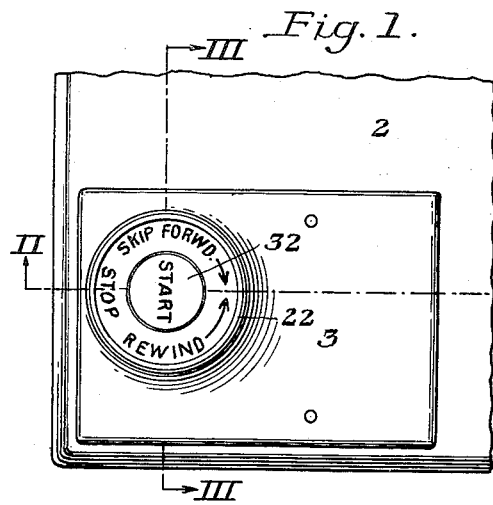

By way of explanation it may be stated that pneumatic circuits of the type used in the operation of player pianos, typewriters and the like, comprise a suction pump and a number of circuits from which the air is exhausted. These circuits in turn contain bellows-like pneumatics which are collapsed under suction and which expand when atmospheric air is admitted to the circuit. The control of these pneumatics is therefore accomplished through the use of valves which normally close off the suction line but which, upon being opened admit air from the atmosphere, thereby breaking the suction in the particular line in which the valve is located, causing the pneumatic which is controlled by the valve to actuate. Sometimes the air is admitted directly to the pneumattic which is to be controlled and sometimes the impulse of air is merely used to control a pilot valve which in turn controls the pneumatic. These circuits are well known to those skilled in the art and reference is made thereto only that the nature of the present invention may be more fully understood.

In Figures 1, 2, 3 and 4 of the drawings, 2 designates a portion of the frame of a pneumatically controlled typewriter. Mounted on this frame is a supporting casting 3 which serves as a support for the valve operating member to be hereinafter described. Supported on the underside of the housing is a valve block 4. Extending downwardly from the valve block are a series of pins 5 and spaced below the valve block is a cross bar 6. On the underside of the valve block 4 are a plurality of metal valves or fingers designated A, B, C, D and E. The rearmost terminals of these fingers are provided with holes through which the pins 5 pass. Each of these fingers is provided with a depending pin 7 surrounded by a coil spring 8. These springs serve to push the respective fingers upwardly. Each of the fingers is provided with a felt pad 9 by means of which it forms a closure for those openings in the undersurface of the block 4 which the valve controls.

Figure 6:
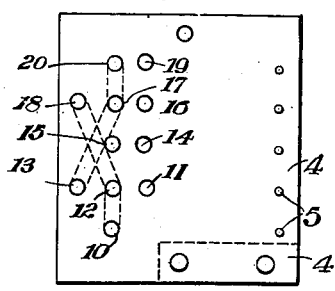
Figure 6 is a bottom plan view of the valve shown in Figure 4 with the several valve fingers removed.

Each valve finger has the pad 9 thereof positioned over one or more ports in the valve block 4. Under the valve finger E there is a single port 10. Under the next valve finger D there are three ports, 11, 12 and 13. Under the valve finger C there are two ports 14 and 15. Under the valve finger B there are three ports 16, 17 and 18. Under the valve finger A there are two ports 19 and 20. In certain instances there are cross connections from one port to another, as for example port 10 is connected through a passage to port 12 and also to port 18 as is clearly shown in Figure 6. Port 13 is connected also with ports 17 and 20. Mounted on the valve block are a series of nipples which communicate with certain of the ports as for example port 10 leads to a nipple 10a (see Figure 7). Port 11 leads to nipple 11a; nipples 14a and 15a are provided for the two ports 14 and 15; nipple 16a is provided for the port 16 and there are two nipples 19a and 20a for the ports 19 and 20, respectively.

Figure 2:
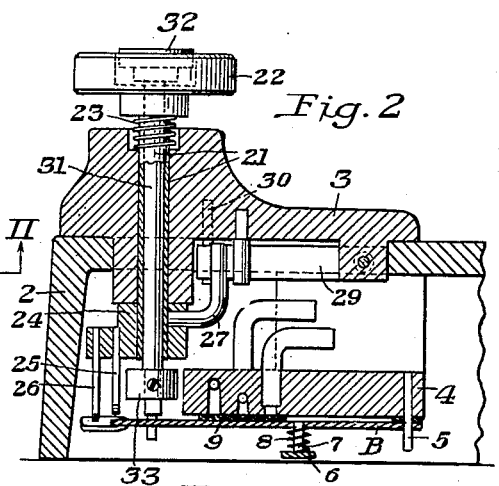
Figure 2 is a longitudinally vertical section in the plane of line II—II of Figure 1.
Figure 3:
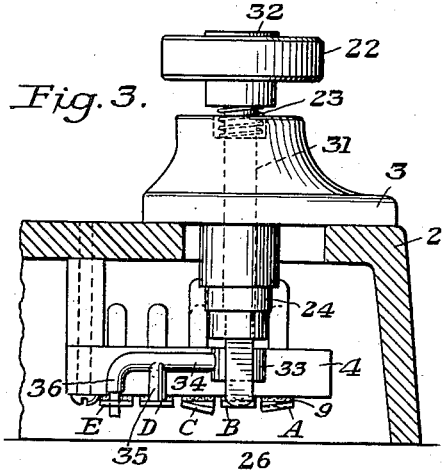
Figure 3 is a transverse vertical section in the plane of line III—III of Figure 1.
Figure 4:
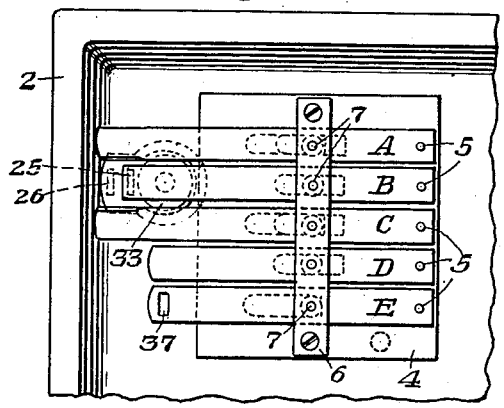
Figure 4 is a bottom plan view of the valve arrangement.
Figure 5:
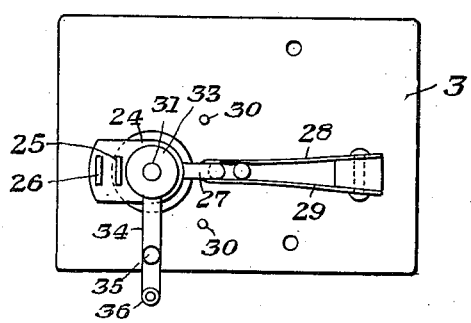
Figure 5 is a bottom plan view of the operating parts of the valve with the several spring fingers of Figure 4 removed.

The valve finger B located between the valve finger A and C is shorter than the valve fingers A and C and the free outer ends of the fingers A and C are oppositely sloped, as shown in Figure 3 away from the intermediate finger B. Located in the casting 3 so as to be directly above the finger B is a hollow shaft 21 having a knob 22 affixed thereto. A compression spring 23 bearing against the underside of the knob 22 tends to urge the shaft and knob upwardly. On the lower end of the hollow shaft 21 is a hub member 24 having two fingers or projections 25 and 26 extending downwardly therefrom, the finger 26 being longer than the finger 25. The finger 25 is over the end of the finger B whereas the finger 26 is forwardly of the free end of the finger B as shown in Figure 2. The arrangement is such that when the knob 22 is pressed downwardly the finger 25 will engage the valve finger B to open the ports which are under the finger B. When pressure is released from the knob it will be forced upwardly, permitting the valve finger to close. If however instead of depressing the knob 22 the knob is rotated in one direction or the other the finger 26 will engage the sloped ends of either the finger A or the finger C, depending upon the direction of rotation and by reason of the inclination of the ends of these fingers will cam or force one finger or the other down. The normal neutral position for the knob is that shown in Figures 2 and 3 where the finger 25 is above the valve finger B and the finger 26 is between the valve finger A and C. In order to resiliently hold the shaft 21 in this neutral position or to return it to neutral position after the shaft has been rotated there is provided on the hub 24 an upwardly curved arm 27, the free upper terminal of which is positioned between two leaf springs 28 and 29 (see Figure 5). When the shaft 21 is turned in one direction leaf spring 28 is flexed and when it is turned in the opposite direction leaf spring 29 is flexed and upon release of the knob the flexed spring operating against the finger 27 rotates the shaft back to its normal neutral position. Stop pins as shown at 30 in Figure 5 are provided to limit the maximum rotation of the knob.

It will thus be seen that by pressing down on the knob one valve finger can be operated and that by rotating the knob in one direction or the other two other valve fingers may be operated. Inside the hollow shaft 21 is a second shaft 31 having a button 32 on the top thereof which is recessed in the center of the knob 22. On the lower end of this shaft is a hub 33 from which projects a laterally extending arm 34 (see Figure 3) with two depending projections 35 and 36 thereon, the projection 36 having a terminal portion of reduced cross section so as to project through the opening 37 in the valve finger E to restrain the inner shaft against rotation when the knob 22 is rotated. The projection 35 bears directly against the top of the valve finger D so that the slightest downward movement of the button 32 will serve to open the valve finger D. There is lost motion however between the valve finger E and the projection 36 so that initial downward movement of the button 32 will not operate the finger E but continued further downward movement will cause the projection 36 to operate the valve finger E.

The nipples 10a, 11a, 14a, 15a, 16a, and 20a are, as shown in Figure 7, connected into the pneumatic circuit so that the operation of each valve finger will cause a predetermined functioning of the machine. For example the valve finger B stops the travel of the record roll either forward or backward. Thus by merely pressing down on the knob without turning it at all the operator may instantly stop the drive of the record spool. By turning the knob 22 to depress the finger A the rewinding of the record may be initiated. By turning the knob 22 to depress the finger C the fast skip forward drive for the record roll is initiated. If for example the record spool contains several selections or several different letters and the operator wants to use the record near the end of the spool, the turning of the knob 22 will cause the record to travel forward at high speed without the typewriter operating. When the record roll is stopped and it is desired to start it so as to write or reproduce the record the central button 32 in the knob is depressed, causing the record to be driven forward at the proper speed and causing the typewriter to operate. For running the record spool slowly forward without operating the typewriter the start button is pressed further so as to depress the finger E as well as the finger D. This allows the mechanism which operates the record spool to continue to operate but cuts out of operation the selector unit which causes the character keys on the typewriter to operate. With the exception of the slow skip forward pneumatic circuit, i. e., the one controlled by the finger E, the pneumatic circuits include on-and-off valves the function of which is to maintain the circuit which has been last operated in an operating condition until some change is made. For example, when the knob 22 is rotated in the direction to rewind the record the knob may be operated for just an instant and then released but the record roll will continue to rewind until the operator again operates the control or until an opening in the record roll causes an automatic change in the circuit as for example in the rewinding of the record. When the forward end of the record is reached an opening in the record will uncover an opening in the pneumatic tracker bar to stop the rewind. In Figure 7 the on-and-off valve in the rewind circuit is designated 38 and another on-and-off valve is indicated at 39, this being in the fast skip forward circuit. When the valve 38 is in the "on" position the valve 39 is in the "off" position and this is the reason why certain valve fingers control more than a certain port. The pneumatic circuits per se however form no part of the present invention and are fully shown and described in my copending application Serial No. 331,564, filed April 25, 1940, above referred to and it will be clearly apparent to those skilled in the art how the various circuits operate. As hereinbefore indicated the present invention is concerned with the valve structure per se and not with the pneumatic circuits except as they may be incidentally involved.

The limited movement of the knob 22 is such that the finger 25 will never be completely clear of a position above the finger B so that no matter where the knob is turned to the machine may be instantly stopped by pushing down on the knob. Pushing down on the knob therefore always serves to stop the machine. Turning it in one direction accomplishes the skip forward at high speed and turning it in the other direction causes rewinding. Operation of the button 32 serves to start the machine, whereas pushing the button 32 down to its limit causes the record roll to travel slowly at writing or reproducing speed but without the selector unit operating. This last described operation is not very frequently required but is desirable where a portion of a record, as for example a particular sentence, date, paragraph or expression is to be eliminated, or some other insertion made manually in its place. The forward travel of the record roll without the selector operating is accomplished only so long as pressure is maintained on the start button and only so long as the pressure is sufficient to depress the valve finger E. For all other operations the knob or button is only momentarily operated and then released but the operation which after it is initiated persists until some other operation takes place either by manually operating the control or by the automatic operation of the machine itself.

While I have illustrated and described one particular construction and one particular pneumatic circuit it will be understood that this is merely by way of illustration and that various modifications and changes may be made within the contemplation of my invention and under the scope of the following claims.

I claim:

1. A control valve of the class described having a plurality of separate valve fingers and means for selectively moving the fingers comprising a knob and a rotatable and reciprocable shaft on which the knob is carried, means on the shaft for engaging and operating one or another of said fingers upon rotation of the knob in one direction or another from a neutral position and another means on the shaft for operating another of said fingers when the shaft is moved axially from a neutral position.

2. A control valve of the class described having a plurality of separate valve fingers and means for selectively moving the fingers comprising a knob and a rotatable and reciprocable shaft on which the knob is carried, means on the shaft for engaging and operating one or another of said fingers upon rotation of the knob in one direction or another from a neutral position and another means on the shaft for operating another of said fingers when the shaft is moved axially from a neutral position, and yieldable means for normally returning the knob to neutral position.

3. A control valve of the class described having a plurality of separate valve fingers and means for selectively moving the fingers comprising a knob and a rotatable and reciprocable shaft on which the knob is carried, means on the shaft for engaging and operating one or another of said fingers upon rotation of the knob in one direction or another from a neutral position, another of said fingers being under the end of said shaft in position to be operated by downward reciprocation of said first shaft, a second shaft centrally positioned within the first and having a push button on the upper end thereof at the center of said knob, an arm projecting laterally from the lower end of said second shaft, means on said arm for engaging another valve finger, and means for restraining the second mentioned shaft from rotation with the first, said second shaft being reciprocable with the first or independently thereof, whereby the second shaft may be selectively operated by pushing the button only or both may be operated by pushing the knob.

4. A control valve for a pneumatic mechanism of the class described comprising a valve member having a plurality of parallel valve fingers which are normally resiliently urged to a closed position, and an operating mechanism in the form of a single unit for selectively operating said fingers, said operating means being supported for rotation and axial movement, means on the operating means for operating certain of said fingers upon rotation of the operating means, other means for operating a selected one of said fingers upon axial movement of the operating means, and means for normally holding the operating means in a neutral position in which all valves are closed.

5. A control unit for pneumatic circuits of the class described in which the circuits regulate the starting and stopping and forward and reverse travel of a record roll comprising a knob, a shaft on which the knob is carried, means for supporting the shaft, said shaft being rotatable and being movable in an axial direction, a plurality of valve fingers adjacent the lower end of said shaft, one of said fingers being coupled to a record spool stopping circuit means on the shaft for operating selected fingers upon rotation of the shaft, said valve fingers and means on the shaft being so arranged that pressure upon the knob to move the shaft in an axial direction effects in any position of the knob the operation of the said valve finger for the stopping of the record roll.

6. A control unit for pneumatic circuits of the class described in which the circuits regulate the starting and stopping and forward and reverse travel of a record roll comprising a knob, a shaft on which the knob is carried, means for supporting the shaft, said shaft being rotatable and being movable in an axial direction, a plurality of valve fingers adjacent the lower end of said shaft, means on the shaft for operating selected fingers upon rotation of the shaft, other means on the lower end of said shaft for operating another of said fingers upon axial movement of the shaft, a pneumatic circuit for stopping the record spool governed by said last named finger whereby axial movement of the knob at any position to which it is turned will stop the record spool, and means for normally holding the shaft and knob in a neutral position.

7. In a pneumatic mechanism of the class described a control valve having a number of depressible fingers each of which normally closes at least one port which opens to atmosphere and some of which control more than a single port, and cross connections so arranged that the opening of a port under one finger also admits atmospheric air to a selected port under another finger whereby upon the operation of certain fingers to open the ports controlled thereby atmospheric air may also be admitted to the circuit controlled by one of the ports underlying another finger.

GEORGE W. CARLSON.